United States Patent Office 3,408,385
Patented Oct. 29, 1968

3,408,385
RACEMIZATION OF α-ALKYL PHENYLALANINES
David Taub, Metuchen, N.J., assignor to Merck & Co., Inc., Rahway, N.J., a corporation of New Jersey
No Drawing. Filed Oct. 4, 1963, Ser. No. 313,765
8 Claims. (Cl. 260—479)

ABSTRACT OF THE DISCLOSURE

α-Alkyl phenylalanines, particularly the D-isomer, upon acylation followed by oxidation with lead tetraacetate is converted to an N-acyl-α-alkyl-β-phenethyl ketimine which optionally can be hydrolyzed to the corresponding ketone. Either the ketimine or ketone then can be converted to racemic α-alkyl-α-acylamino-β-phenylpropionitrile which can either be resolved and the L-form converted to an L-α-alkylphenylalanine or the racemic propionitrile can be converted to a racemic α-alkylphenylalanine which may be resolved and the D-form again degraded to the ketimine or ketone to be recycled in the foregoing process to make, in particular, the antihypertensive product, L-α-methylDOPA.

---

This invention relates to the utilization of the unusable optical isomers of certain amino acids by their conversion back to intermediates from which the racemates, which include the usable isomers, can be resynthesized. More specifically, this invention relates to a process for the conversion of a D-α-lower alkyl(3,4-dihydroxy) (or diloweralkoxy)phenylalanine to either an N-acyl-α-lower alkyl-3,4-diacyloxy (or diloweralkoxy) benzyl ketimine or the corresponding α-lower alkyl-3,4-diacyloxy (or diloweralkoxy)benzyl ketone which comprises acylating the said dihydroxy (or diloweralkoxy)phenylalanine, oxidizing the resulting N-acyl-diacyloxy (or diloweralkoxy) phenylalanine by treating with lead tetraacetate in an inert solvent to produce said N-acyl-α-lower alkyl diacyloxy (or diloweralkoxy)phenyl ketimine and, if desired, hydrolyzing said ketimine to the corresponding diacyloxy (or lower alkoxy)benzyl lower alkyl ketone, either said ketone or said precursor ketimine being intermediates from which said dihydroxy (or diloweralkoxy)phenyl alanine can be resynthesized in racemic form to produce the desired L form from the undesired D form. More specifically also, this invention relates to a process for converting said D-α-lower alkyl-3,4-dihydroxy or lower alkoxy phenylalanine to a DL (3,4-diacyloxy (or lower alkoxy) phenyl) acylamido-2-lower alkyl propionitrile which comprises, after forming said ketimine, heating of the said ketimine with liquid hydrogen cyanide and an amine in an inert medium. Still more specifically, this invention also relates to processes for converting said D-α-lower alkyl 3,4-dihydroxy or lower alkoxy phenylalanine to a DL-α-amino-α-lower alkyl-β-(3,4-diacyloxy (or lower alkoxy) phenyl) propionitrile which comprises, after forming said acylamido propionitrile, in addition heating the said acylamido propionitrile with an alkalimetal lower alkoxide in an alcohol solvent. More specifically also, this invention relates to the N-acyl-dilower alkoxy or acyloxy benzyl lower-alkyl-ketimines as new compounds useful as intermediates for such recycling.

The discovery that α-methyl-3,4-dihydroxyphenyl alanine (also referred to as α-methylDOPA) is a potent antihypertensive is a great advance in the treatment of hypertension. This compound has been produced from 3,4-dihydroxy, 3,4-dimethoxy, 3-methoxy-4-hydroxy or 3,4-acyloxybenzyl methyl ketone, (it is preferred to convert the 3,4-dihydroxy compound to the methoxy derivative prior to further reaction) by one of two processes. One process proceeds through a hydantoin intermediate and the other through an amino nitrile. Both syntheses produce the amino acid as a racemic mixture. The antihypertensive activity, however, resides in the L-form only and resolution of the racemic mixture accumulates large quantities of the inactive D-form, representing large economic waste. Therefore, in order to reduce the eventual cost to the consumer, it is necessary to convert the D-form to the L-form.

In the past, this conversion has been attained by the regeneration of the dimethoxybenzyl lower-alkyl ketone from the dihydroxy amino acid, by a process which comprises protection of the amino group by acylation, alkylation of the hydroxyls and removal of the protecting group from the amine, followed by oxidation of the resulting alkoxy amino acid. The acylation protects the nitrogen group during the alkylation of the hydroxyl groups. The alkylation is employed primarily to protect the hydroxyl groups during the oxidation of the amine to the ketone and finally the deacylation of the nitrogen position is necessary to carry out the oxidation to the ketone.

I have found that the recovery of the unusable D-form of α-methylDOPA as a DL-intermediate which can be recycled to form DL-α-methylDOPA can be more efficiently and effectively accomplished by effecting the oxidation by the action of lead tetraacetate upon the N-acyl derivatives of the O-acyl or O-alkyl derivatives of α-methylDOPA. I have further found said N-acyl derivatives to be highly useful intermediates for this process.

It is an advantage of my invention that:

(1) Acylation of the existing hydroxyl groups is sufficient to protect the hydroxyls on subsequent oxidation;
(2) The use of lead tertaacetate eliminates the necessity of deacylating the nitrogen;
(3) Obtaining the imine compounds and conversion to amino nitriles avoids the necessity of producing the benzyl ketone which must undergo the Strecker reaction to produce amio nitrile;
(4) The acylamido derivatives can be directly hydrolyzed to the amino acid, thus avoiding the preparation of both the amino nitrile and the ketone.

In accordance with this invention for the preparation of the phenyl ketone, a lower alkyl-3,4-dihydroxy phenylalanine is acylated, then oxidized to the imine, which in turn can be hydrolyzed to the benzyl lower alkyl ketone, an intermediate for the preparation of DL-α-methylDOPA. Alternatively, the imine can be converted to a DL-3-(3,4-diacyloxy or lower alkoxy phenyl)-2-acylamido-2-lower alkyl propionitrile material by reaction of the said imine with hydrogen cyanide and said DL-acylamido propionitrile can be converted to the DL-amino nitrile (another intermediate further along toward DL-α-methylDOPA) by a reaction with a metal alkali alkoxide.

The starting material in the process of this invention may be an α-lower alkyl-3,4-diacyloxy, α-lower alkyl-3,4-diloweralkoxy, or α-lower alkyl-3-loweralkoxy-4-hydroxy-β-phenylalanine. Said alkoxy starting materials represent the penultimate step in the synthesis of α-methylDOPA and resolution at that stage permits a shorter recycle circuit.

In carrying out the above process, the starting 3,4-dialkoxy, or 3-alkoxy-4-hydroxy-α-lower alkyl phenylalanines may have any α-lower alkyl substituent, as for example, methyl, ethyl, isopropyl, butyl and the like, (usually it is α-methyl). The alkoxy may be methoxy, ethoxy, butoxy and the like, preferably methoxy. The acyloxy may be formyl, acetyl, propionyl, benzoyl, phenylacetyl and the like.

The process may be illustrated as follows:

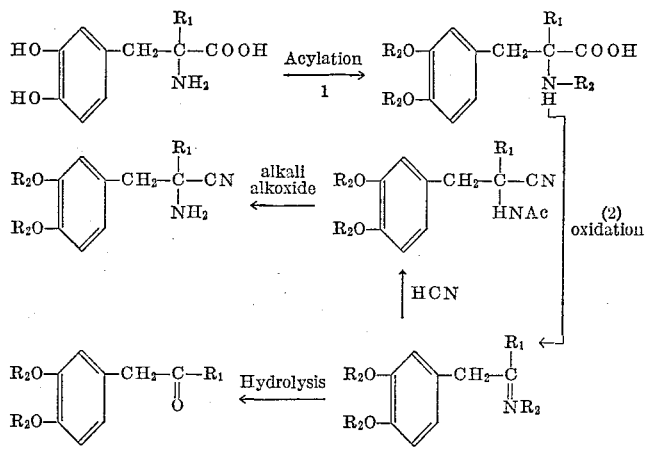

wherein, in each of the foregoing structures, $R_2$ is an acyl group and $R_1$ is a lower alkyl group.

The first step for producing the benzyl ketone comprises (see Flow Sheet I) the acylation of the amino acid to protect the hydroxyl groups (when free hydroxyls are present) during the oxidation step as well as to form the necessary N acyl group for the oxidation step. Many carboxylic acid acylating agents may be used for this purpose, such as anhydrides or acid halides derived from lower alkanoic acids, such as acetic acid, propionic acid, butyric acid and the like, and aryloic acids such as benzoic acid, toluic acid, substituted toluic acids and the like. Preferably, one uses acetyl chloride or acetic anhydride.

Especially useful is the reaction with an acid anhydride either using an excess of the anhydride as its own solvent or using another solvent, particularly an organic base such as pyridine or dimethylaniline. Also useful is reaction with an acid halide, which is normally carried out in another solvent with an acid acceptor. The acid acceptor may be an organic basic solvent or an added material such as calcium carbonate and sodium carbonate. Acylation normally occurs quite readily to form the acyl derivative. In the case of acetic anhydride, which is the preferred acylating agent, the reaction occurs in pyridine solution at room temperature in a few hours. With other acylating agents and solvents, the reaction time and temperature will vary depending upon the reagents and solvents employed.

Isolation of the acyl derivative is accomplished by adding an aqueous solution of a water soluble acid, to the acylated phenylalanine mixture. The acid employed may be any water soluble mineral or organic acid whose first ionization constant has a pK value of no larger than five, such as hydrochloric acid, sulfuric acid, phosphoric acid, trichloroacetic acid and the like. Precipitation of the acylated phenylalanine occurs when the aqueous mixture is made acid. The compound is filtered, washed with water and dried. It is preferred, however, first to concentrate the acylated material in vacuo, then to cool the resulting concentrate in an ice bath, and finally to add sufficient 6N hydrochloric acid to acidify the mixture to precipitate the acyl phenylalanine.

The next step, the oxidation reaction, is carried out by the addition of lead tetraacetate to the isolated acylphenyl-alanine in a liquid aromatic hydrocarbon such as benzene, toluene, xylene and the like, or another organic solvent such as dioxane, chloroform, methylene chloride, tetrahydrofuran, acetonitrile, ether and the like. The preferred solvent being acetonitrile. The only restriction upon the minimum quantity of lead tetraacetate to be used for the oxidation would be the practical limitations of yield of oxidized product when less than equimolar quantities of lead tetraacetate to the acylated compounds are used. In addition, the maximum molar ratio of lead tetraacetate to be employed would be governed by the cost of additional lead tetraacetate as well as the difficulty that is encountered in isolation of the substituted phenylketone as larger amounts of lead tetraacetate are employed. It is preferred to use equimolar quantities of lead tetraacetate and acyl phenylalanine.

The temperature at which this step is carried out is not critical. The reaction may be carried out at room temperature or elevated temperatures up to the reflux temperature of the system. Likewise, the time of reaction is not critical and any suitable time may be used, along with the solvents and temperature, to effect complete reaction. It is preferred, however, to carry out the reaction at the reflux temperature of acetonitrile for 30 minutes.

In the preferred oxidation step, an equal molar quantity of lead tetraacetate is added to a solution of N-acyl-phenylalanine in acetonitrile. The mixture is heated to the reflux temperature of the solvent and maintained at reflux for 30 minutes. Additionally, it is preferred to use a small amount of pyridine to remove the traces of acetic acid usually associated with lead tetraacetate.

The imine thus formed may be used to prepare the ketone or isolated and used to prepare the acetamido nitrile. These imines form a distinct embodiment of this invention.

In the preparation of the ketones, hydrolysis of the benzylketimine may be carried out by reacting the oxidized solution in an aqueous solution of a water soluble acid whose first ionization constant has a pK of 4–5; such as acetic acid, acrylic acid, butyric acid and the like. The reaction rate of the oxidation is a function of temperature. However, it is preferred that a minimum temperature of 60° be maintained for this reaction in order to complete the oxidation within a minimum time. Where time is of less importance, oxidation below 60° can be carried out. In addition when the substituents on the 3,4 position are lower alkoxy groups, stronger acids may also be used much as HCl, $H_2SO_4$ and the like. When these acids are used, 0.1 N HCl is preferred. Although time is not critical in this reaction, differing time of reactions will be found useful with various acids and temperatures. In the preferred procedure, the hydrolysis is carried out over a period of 50 minutes at a temperature of 95° C. in a 60% mixture of acetic acid and water. The ketone may be isolated by extraction with a water immiscible organic solvent such as benzene, ether, chloroform and the like, chloroform being the preferred solvent. The extracted and isolated substituted benzylketone is then ready for recycling into the synthesis of the racemic amino acids.

Alternatively, the benzylketimine may be converted to the acylamidonitrile. The imine mixture is filtered, concentrated and placed in an organic solvent such as an alcohol, aromatic hydrocarbon and ether, but preferably dimethyl sulfoxide. To this solution is added liquid hydrogen cyanide and a cyclic or acyclic secondary or tertiary amine such as diethylamine, dipropylamine, triethylamine, tripropylamine, pyridine, piperidine and the like, preferably, however, triethylamine. This solution is maintained at any desired temperature which will effect reaction (the reaction time will depend upon the nature of the reactants and the reaction temperature) then concentrated to dryness in vacuo. In the preferred procedure, the reaction mixture is maintained at 50° C. for 16 hours. After the required reaction time, water is added to the reaction and the mixture is extracted with a water insoluble solvent such as ether, benzene, toluene, carbon tetrachloride, chloroform and the like. The preferred extraction solvent is chloroform. The organic extract is then washed with a dilute solution of potassium bicarbonate, dried over a drying agent such as sodium sulfate and concentrated to dryness in vacuo to obtain the 3-(3′,4′-diacyloxy or lower alkanoyloxyphenyl)-2-acetamido-2-methylpropionitrile.

In the preparation of the amino nitrile, the said acetamido nitrile is placed in an alcohol solvent such as methanol, ethanol, propanol and the like, but preferably N-propanol. To this solution is added an alkali metal alkoxide such as sodium and potassium methoxide, ethoxide and the like, over a period of time sufficient to substantially complete the reaction at the reflux temperature of the solvent employed. The mixture is then cooled and the solvent, if required, is removed in vacuo. The preferred procedure employs sodium methoxide and N-propanol and refluxes this mixture for a period of two hours. Water is added to this reaction mixture as well as a water insoluble solvent such as ether, benzene, toluene, carbon tetrachloride, chloroform and the like, but preferably chloroform, and the mixture extracted. The organic layer is dried over a drying agent such as magnesium sulfate, filtered and concentrated to dryness to give the amino nitrile. In the 3,4-diacetoxy series, the reaction must be carried out in the absence of oxygen, the product in this case is the 3,4-dihydroxyaminonitrile.

The following examples are given for purposes of illustrating the present invention and are not to be construed as limiting the invention.

EXAMPLE 1

α-Methyl-3,4-dihydroxyphenylalanine triacetate

Acetic anhydride (40 mls.) is added portionwise to a stirred slurry of 10.0 gms. of D-α-methyl-3,4-dihydroxyphenylalanine in 40 mls. of dry pyridine. A clear yellow solution is obtained after ½ hour, and stirring is maintained for 16 hours. The reaction mixture is then concentrated in vacuo to a thick slurry, cooled in an ice bath and acidified with 6 N hydrochloric acid. At this point, 20 mls. of water are added to the reaction mixture, which results in the immediate precipitation of the triacetate. The mixture is aged and filtered. The cake is then washed with water and dried to give 13.2 gms. of D-α-methyl-3,4-dihydroxyalanine triacetate.

Similarly when D-α-ethyl-3,4-dihydroxyphenylalanine and D-α-propyl-3,4-dihydroxyphenylalanine are used in place of D-α-methyl-3,4-dihydroxyphenylalanine, there are obtained D-α-methyl-3,4-dihydroxyphenylalanine, there are obtained D-α-ethyl-3,4-dihydroxyphenylalanine triacetate and D-α-propyl-3,4-dihydroxyphenylalanine triacetate respectively.

Similarly also, when propionic anhydride is used in place of acetic anhydride there is obtained D-α-methyl-3,4-dihydroxyphenylalanine tripropionate, D-α-ethyl-3,4-dihydroxyphenylalanine tripropionate and D-α-propyl-3,4-dihydroxyphenylalanine tripropionate from D-α-methyl-3,4-dihydroxyphenylalanine, D-α-ethyl - 3,4 - dihydroxyphenylalanine, and D-α-propyl-3,4-dihydroxyphenylalanine respectively.

Similarly when benzyl chloride and phenyl acetyl chloride are used in place of acetic anhydride there are obtained D-α-methyl-3,4-dihydroxyphenylalanine tribenzoate and D-α-methyl-3,4-dihydroxyphenylalanine triphenylacetate respectively.

EXAMPLE 2

α-Methyl-N-acetyl-β-(3-methoxy-4-acetoxyphenyl)-alanine

The procedure of Example 1 is employed, using D-α-methyl-3-methoxy-4-hydroxyphenylalanine in place of D-α-methyl-3,4-dihydroxyphenylalanine. There is obtained α-methyl-N-acetyl-β-(3 - methoxy-4-acetoxyphenyl)-alanine.

EXAMPLE 3

3,4-diacetoxyphenylacetone

Pyridine, (4 mls.), followed by 0.05 mole of lead tetraacetate is added to a solution of 0.05 mole of α-methyl-3,4-dihydroxyphenylalanine triacetate (obtained from Example 1) in 125 mls. of acetonitrile. The mixture is cautiously warmed to reflux temperature and maintained at reflux for 30 minutes. (As the reaction proceeds, a precipitate a lead acetate is formed.) The mixture is then cooled, filtered and the filtrate concentrated in vacuo to dryness. The residue is hydrolyzed by heating it on a steam bath (90–95° C.) with 15 mls. of acetic acid and 10 ml. of water for 50 minutes. The mixture is cooled to room temperature and additional water added. The mixture is then extracted with (2×100 mls.) of chloroform. The chloroform extract is washed with a solution of dilute potassium bicarbonate and sodium chloride, dried over magnesium sulfate, filtered and concentrated to dryness to give 9.4 gms. (75%) of 3,4-diacetoxyphenylacetone. (The lead tetraacetate reaction may also be carried out as above except for the absence of pyridine with similar results.)

Similarly, when using α-methyl-3,4-dihydroxyphenylalanine tribenzoate and α-methyl-3,4-dihydroxyphenylalanine triphenylacetate in place of α-methyl-3,4-dihydroxyphenylalanine triacetate, there is obtained 3,4-dibenzoyloxyphenylacetone and 3,4-diphenylacetoxyphenylacetone respectively.

EXAMPLE 4

3-methoxy-4-acetoxyphenylacetone

The procedure of Example 3 is employed using α-methyl-N-acetyl-β-(3-methoxy - 4 - acetoxyphenyl)alanine in place of α-methyl-3,4-dihydroxyphenylalanine triacetate. There is obtained 3-methoxy-4-acetoxyphenylacetone.

EXAMPLE 5

3-methoxy-4-hydroxyphenylacetone

To a solution of 0.0019 mole of 3-methoxy-4-acetoxyphenylacetone in 4 mls. of methanol is added 4 mls. of 1 N aqueous sodium hydroxide. The solution is stirred for one hour, while maintaining the temperature at about 25° C. Water is then added and the mixture extracted with ether. The ethereal solution is washed with water, dried over magnesium sulfate and concentrated in vacuo to give 3-methoxy-4-hydroxyphenylacetone.

EXAMPLE 6

3,4-dimethoxyphenylacetone

Dimethylsulfate (0.032 mole) and 4 ml. of 1 N aqueous sodium hydroxide is added to a solution of 0.0019 mole of 3,4-diacetoxyphenylacetone (obtained from Example 3) in 4 mls. of methanol. (This entire reaction mixture is maintained under a flow of nitrogen throughout the reaction.) The solution is stirred for 30 minutes, while maintaining the temperature at about 25° C. Water is then added and the mixture extracted with ether. The ethereal solution is washed with water, dried over magnesium sulfate and concentrated in vacuo to give 3,4-dimethoxyphenylacetone.

EXAMPLE 7

3,4-dimethoxyphenylacetone

The procedure of Example 6 is employed, using 3-methoxy-4-acetoxyphenylacetone in place of 3,4-diacetoxyphenylacetone. There is obtained 3,4-dimethoxyphenylacetone.

EXAMPLE 8

N-acetyl-3,4-diacetoxyphenylacetone-imine

Lead tetraacetate (0.005 mole) is added to a stirred solution of 0.005 mole of α-methyl-3,4-dihydroxyphenylalanine triacetate in 50 mls. of benzene. The mixture is gently refluxed for one hour. (As the reaction proceeds, a precipitate of lead acetate is formed.) The mixture is then cooled, filtered through celite and the filtrate concentrated to dryness in vacuo. The residue obtained consists mainly of α-methyl-N-acetyl-3,4-diacetoxyphenylacetone-imine.

Similarly, when α-ethyl-3,4-dihydroxyphenylalanine triacetate and α-propyl-3,4-dihydroxyphenylalanine triacetate are used in place of α-methyl-3,4-dihydroxyphenylalanine, triacetate, there are obtained α-ethyl-N-acetyl-3,4-diacetoxyphenylacetone-imine and α-propyl-N-acetyl-3,4-diacetoxyphenylacetone-imine, respectively.

Similarly, when α-methyl-3,4-dihydroxyphenylalanine tripropionate, α-ethyl-3,4-dihydroxyphenylalanine tripropionate and α-propyl-3,4-dihydroxyphenylalanine tripropionate are used in place of α-methyl-3,4-dihydroxyphenylalanine triacetate, there are obtained α-methyl-N-propionyl-3,4-dipropionoxyphenylacetone-imine, α - ethyl-N-propionyl-3,4-dipropionoxyphenylacetone - imine and α-propyl - N - propionyl - 3,4 - dipropionixyphenylacetone-imine, respectively.

Similarly, when α - methyl-3,4-dihydroxyphenylalinine tribenzoate and α-methyl-3,4-dihydroxyphenylalanine triphenylacetate are used in place of α-methyl-3,4-dihydroxyphenylalanine triacetate, there are obtained α-benzoyl-3,4-dibenzoyloxy-phenylacetone-imine and α - phenylacetyl-3,4-diphenylacetoxyphenylacetone-imine respectively.

EXAMPLE 9

3,4-dimethoxyphenylacetone

The procedure of Example 3 is followed using equivalent amounts of N-acetyl-α-methyl-3,4-dimethoxyphenylalanine in place of α-methyl-3,4-dihydroxyphenylalanine triacetate to obtain 3,4-dimethoxyphenylacetone.

EXAMPLE 10

3-(3',4'-dimethoxyphenyl)-2-acetamido-2-methyl-propionitrile

To a solution of 400 mg. of N-acetyl-3,4-dimethoxyphenylacetone-imine in 3 mls. of dimethyl sulfoxide is added 1 ml. of liquid hydrogen cyanide and 0.5 ml. triethylamine. The red solution is kept at 50° overnight, then concentrated in vacuo to dryness. Water is added and the mixture is extracted with chloroform. The chloroform extract is washed with dilute potassium bicarbonate solution, dried over magnesium sulfate and concentrated in vacuo to dryness. Paper chromatography (benzene-chloroform: 6–4 mobile phase; formamide stationary phase) shows the formation of the acetamido propionitrile, which is isolated by chromatography on alumina.

Similarly, when N-acetyl-3,4-diacetoxyphenylacetone-imine, N-benzoyl-3,4-dibenzoyloxyphenylacetone - imine and N-phenylacetyl-3,4-diphenylacetoxyphenyl - acetone-imine are used in place of N-acetyl-3,4-dimethoxyphenylacetone-imine there are obtained 3-(3',4'-diacetoxyphenyl)-2-acetamido-2-methylpropionitrile, 3-(3',4'-dibenzoyloxyphenyl) - 2 - benzamido-2-methyl-propionitrile and 3-(3',4' - diphenylacetoxyphenyl) - 2 - phenylacetamido - 2-methylpropionitrile respectively.

EXAMPLE 11

α-amino-α-methyl-β-(3,4-dimethoxyphenyl)-propionitrile

To a solution of 1.0 g. of 3-(3',4'-dimethoxyphenyl)-2-acetamido-2-methylpropionitrile in 50 mls. of N-propanol is added 400 mg. of sodium methoxide and the mixture is refluxed two hours. It is then cooled, and the solution concentrated in vacuo. Water and chloroform are added and the mixture is extracted with chloroform. The organic layer is dried over magnesium sulfate, filtered and concentrated to dryness to give α-amino-α-methyl-β-(3,4-dimethoxy)-propionitrile.

Similarly, when using 3-(3'.4'-diacetoxyphenyl)-2-acetamido-2-methylpropionitrile, 3 - (3',4'-dibenzoyloxyphenyl)-2-benzamido-2-methylpropionitrile and 3-(3',4' - diphenylacetoxyphenyl) - 2 - phenylacetamido - 2 - methylpropionitrile in place of 3-(3',5'-dimethoxyphenyl)-2-acetamido-2-methylpropionitrile there are obtained α-amino-α-methyl-β-(3,4-diacetoxyphenyl)-propionitrile, α-amino-α-methyl-β-(3,4-dibenzoyloxyphenyl-propionitrile and α-amino - α - methyl - β - (3,4 - diphenylacetoxyphenyl)-propionitrile respectively.

I claim:

1. A process for converting a compound of the formula:

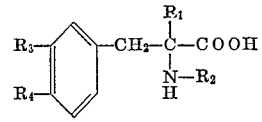

in which $R_1$ is a lower alkyl, $R_2$ is selected from the group consisting of benzoyl, phenyl-lower alkanoyl and lower alkanoyl, $R_3$ is selected from the group consisting of lower alkoxy, lower alkanoyloxy, benzoyloxy, and phenyl-lower alkanoyloxy, $R_4$ is selected from the group consisting of lower alkoxy, lower alkanoyloxy, benzoyloxy and phenyl-lower alkanoyloxy to a compound of the formula:

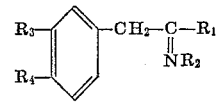

which comprises the step of:

(a) oxidizing the said α-lower alkyl substituted phenylalanine by treating said phenyalanine in an inert solvent with lead tetraacetate at between ambient and reflux temperature to produce the substituted phenyl-ketimine-imine.

2. The process according to claim 1 in which $R_2$ is a lower alkanoyl, $R_3$ and $R_4$ are both lower alkenoyloxy.

3. The process according to claim 1 in which $R_2$ is a lower alkanoyl, $R_3$ is a lower alkoxy and $R_4$ is a lower alkanoyloxy.

4. A process for converting α-methyl-3,4-dihydroxyphenylalanine triacetate to N-acetyl-3,4-diacetoxyphenylacetone-imine, which comprises the step of:

(a) oxiding the said α-methyl-3,4-dihydroxyphenylalanine triacetate by heating in benzene with lead tetraacetate at the reflux temperature of the solvent, to produce N-acetyl-3,4-diacetoxyphenylacetoneimine.

5. A compound of the formula:

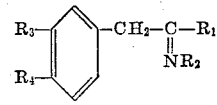

in which $R_1$ is lower alkyl, $R_2$ is selected from the group consisting of a lower alkanoyl, benzoyl and phenyl-lower alkanoyl, $R_3$ is selected from the group consisting of lower alkoxy, lower alkanoyloxy, benzoyloxy and phenyl-lower alkanoyloxy, $R_4$ is selected from the group consisting of lower alkoxy, lower alkanoyloxy, benzoyloxy and phenyl-lower alkanoyloxy.

6. A compound of claim 5 in which $R_2$ is lower alkanoyl and $R_3$ and $R_4$ both are lower alkanoyloxy.

7. A compound of claim 5 in which $R_2$ is lower alkanoyl, $R_3$ is lower alkoxy and $R_4$ is lower alkanoyloxy.

8. N - acetyl - 3,4 - diacetoxyphenolacetone - imine.

References Cited

UNITED STATES PATENTS

| | | | |
|---|---|---|---|
| 3,132,176 | 5/1964 | Bollinger et al. | 260—479 |
| 2,337,825 | 12/1943 | Lahr et al. | 260—479 |
| 2,355,141 | 8/1944 | Boese | 260—479 |
| 2,307,891 | 1/1943 | Lieber | 260—592 |
| 2,346,926 | 4/1944 | Lieber | 260—592 |
| 2,166,487 | 7/1939 | Felix et al. | 260—465 |
| 2,179,895 | 11/1939 | Muller et al. | 260—465 |

OTHER REFERENCES

McCasland et al., J. Am. Chem. Soc., vol. 73, p. 5164 (1951).

LORRAINE A. WEINBERGER, *Primary Examiner.*

C. B. PARKER, D. R. MAHANAND, M. G. BERGER, *Assistant Examiners.*

UNITED STATES PATENT OFFICE
CERTIFICATE OF CORRECTION

Patent No. 3,408,385          Dated October 29, 1968

Inventor(s) David Taub

It is certified that error appears in the above-identified patent and that said Letters Patent are hereby corrected as shown below:

Column 8, Line 18 - 3-(3',5'- should read "(3',4'-".

SIGNED AND SEALED
AUG 11 1970

(SEAL)
Attest:

Edward M. Fletcher, Jr.
Attesting Officer

WILLIAM E. SCHUYLER, JR.
Commissioner of Patents